United States Patent
Lin et al.

(10) Patent No.: US 8,406,015 B2
(45) Date of Patent: Mar. 26, 2013

(54) CONTROL CIRCUIT AND METHOD FOR A FLYBACK POWER CONVERTER TO COMPENSATE FOR AN ENTRY POINT OF A BURST MODE

(75) Inventors: Tzu-Chen Lin, Taipei (TW); Pei-Lun Huang, Longtan Shiang (TW)

(73) Assignee: Richtek Technology Corp., Hsinchu (TW)

( * ) Notice: Subject to any disclaimer, the term of this patent is extended or adjusted under 35 U.S.C. 154(b) by 744 days.

(21) Appl. No.: 12/453,446

(22) Filed: May 12, 2009

(65) Prior Publication Data

US 2009/0284994 A1 Nov. 19, 2009

(30) Foreign Application Priority Data

May 14, 2008 (TW) .............................. 97117743 A (51) Int. Cl.
*H02M 3/335* (2006.01)
*G05F 1/00* (2006.01)
(52) U.S. Cl. ................... 363/21.12; 363/21.18; 323/287
(58) Field of Classification Search ................... 323/287; 363/21.12–21.18
See application file for complete search history.

(56) References Cited

U.S. PATENT DOCUMENTS

| | | | | |
|---|---|---|---|---|
| 6,191,565 B1 * | 2/2001 | Lee et al. | | 323/222 |
| 6,674,656 B1 * | 1/2004 | Yang et al. | | 363/21.1 |
| 6,836,415 B1 * | 12/2004 | Yang et al. | | 363/21.01 |
| 7,088,598 B2 * | 8/2006 | Yang et al. | | 363/21.01 |
| 7,362,592 B2 * | 4/2008 | Yang et al. | | 363/21.13 |
| 7,643,313 B2 * | 1/2010 | Lin | | 363/20 |
| 2007/0120547 A1 * | 5/2007 | Tateishi et al. | | 323/282 |
| 2008/0100277 A1 * | 5/2008 | Yang | | 323/318 |
| 2008/0310194 A1 * | 12/2008 | Huang et al. | | 363/21.18 |
| 2010/0110735 A1 * | 5/2010 | Duan et al. | | 363/21.18 |

* cited by examiner

*Primary Examiner* — Adolf Berhane
*Assistant Examiner* — Gary Nash
(74) *Attorney, Agent, or Firm* — Muncy, Geissler, Olds & Lowe, PLLC (57) ABSTRACT

A control circuit and method are provided for a flyback converter converting an input voltage to an output voltage, to compensate for an entry point of a burst mode of the flyback converter, so that the entry point is not affected by the input voltage, and audible noise resulted from a higher input voltage is reduced without impacting the light load efficiency of the flyback converter.

14 Claims, 10 Drawing Sheets

CONTROL CIRCUIT AND METHOD FOR A FLYBACK POWER CONVERTER TO COMPENSATE FOR AN ENTRY POINT OF A BURST MODE

FIELD OF THE INVENTION

The present invention is related generally to a flyback converter and, more particularly, to a control circuit and method for a flyback converter.

BACKGROUND OF THE INVENTION

Figure 1:
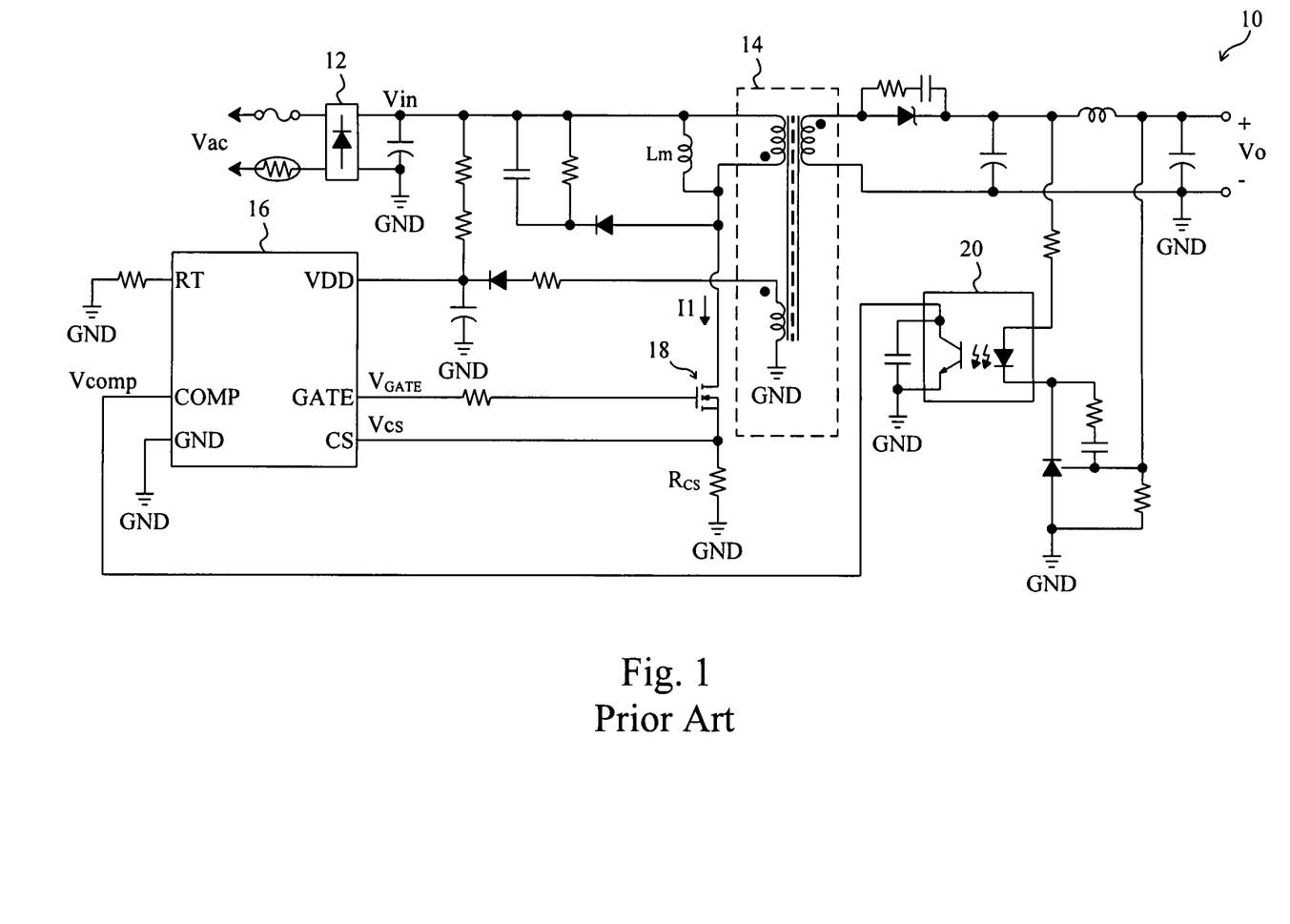
FIG. 1 is a perspective diagram of a conventional current mode flyback converter.

All electrical devices are required a power source for operation. Among the various types of power supplies, switching power converters are widely used because they have better efficiency and provide suitable output modulation. However, when a switching power converter is under light load conditions, its efficiency will reduce due to switching loss. To improve the efficiency at light load, a burst mode strategy is applied to reduce the average switching frequency and save the switching loss. FIG. 1 is a perspective diagram of a conventional current mode flyback converter 10, in which a rectifier 12 converts an AC voltage Vac into a DC input voltage Vin, a controller 16 detects the current flowing through a power switch 18 to obtain a current sense signal Vcs, and provides a control signal $V_{GATE}$ according to the current sense signal Vcs and a feedback signal Vcomp to switch the power switch 18, so as to have a transformer 14 to convert the input voltage Vin into an output voltage Vo, and an opto-coupler 20 generates the feedback signal Vcomp according to the output voltage Vo to feed back to the controller 16. The feedback signal Vcomp is a function of the output voltage Vo.

Figure 2:
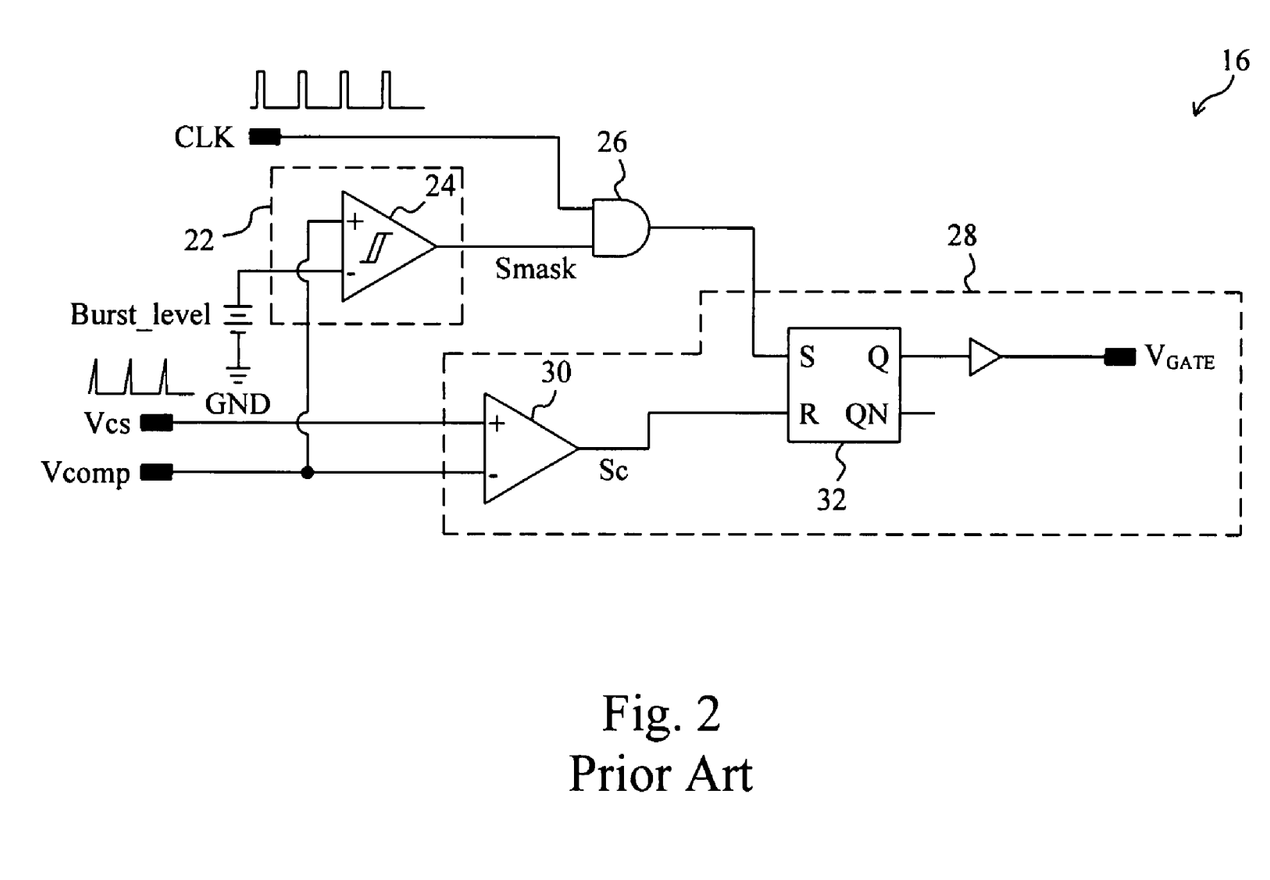
FIG. 2 is a perspective diagram of a portion of the controller shown in FIG. 1.
Figure 3:
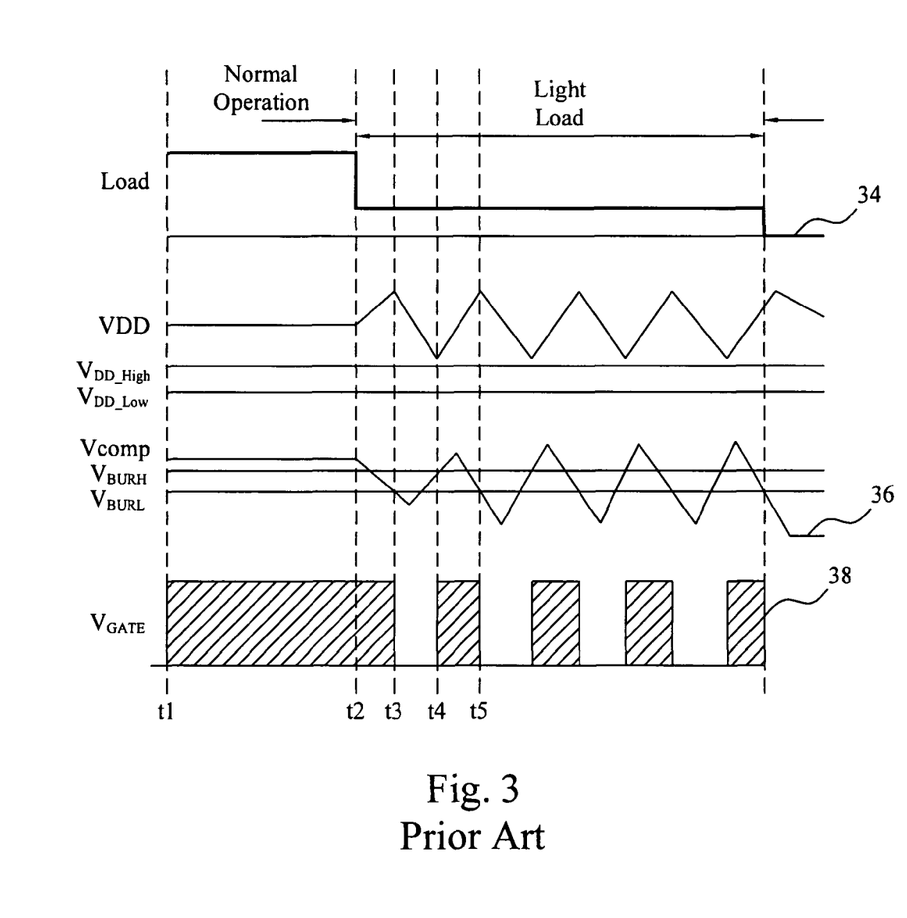
FIG. 3 is waveform diagram of the flyback converter shown in FIG. 1.

FIG. 2 is a perspective diagram of a portion of the controller 16 shown in FIG. 1, in which a burst circuit 22 has a hysteresis comparator 24 to generate a mask signal Smask according to the feedback signal Vcomp and a preset voltage Burst_level to mask a clock CLK by an AND gate 26, and a pulse width modulation (PWM) circuit 28 has a comparator 30 to compare the current sense signal Vcs with the feedback signal Vcomp to generate a comparison signal Sc, and a flip-flop 32 to generate the control signal $V_{GATE}$ according to the output of the AND gate 26 and the comparison signal Sc. FIG. 3 is waveform diagram of the flyback converter 10 shown in FIG. 1, in which waveform 34 represents the load, waveform 36 represents the feedback signal Vcomp, and waveform 38 represents the control signal $V_{GATE}$. Referring to FIGS. 2 and 3, in normal operation, i.e. the load is heavy, as between time t1 and time t2, the feedback signal Vcomp is greater than voltages $V_{BURH}$ and $V_{BURL}$, as shown by the waveform 36, so that the clock CLK is not masked, and in consequence the control signal $V_{GATE}$ is continuously provided to switch the power switch 18, as shown by the waveform 38. The voltages VBURH and VBURL are hysteresis boundaries generated by the hysteresis comparator 24 according to the voltage Burst_level. At time t2, the load turns from heavy to light so that the feedback signal Vcomp begins to drop. When the feedback signal Vcomp is lower than the voltage $V_{BURL}$, as shown at time t3, the flyback converter 10 enters a burst mode, in which the mask signal Smask will switch to logic "0" when the feedback signal Vcomp is lower than the voltage $V_{BURL}$, thus masking the clock CLK, and the mask signal Smask will not switch to logic "1" until the feedback signal Vcomp is higher than the voltages $V_{BURH}$, as shown at time t4. The clock CLK is released when the mask signal Smask switches to logic "1". Hence, a burst cycle is generated to regulate the output voltage Vo and supply sufficient output power. One burst cycle is shown in FIG. 3 as between time t3 and time t5.

Figure 4:
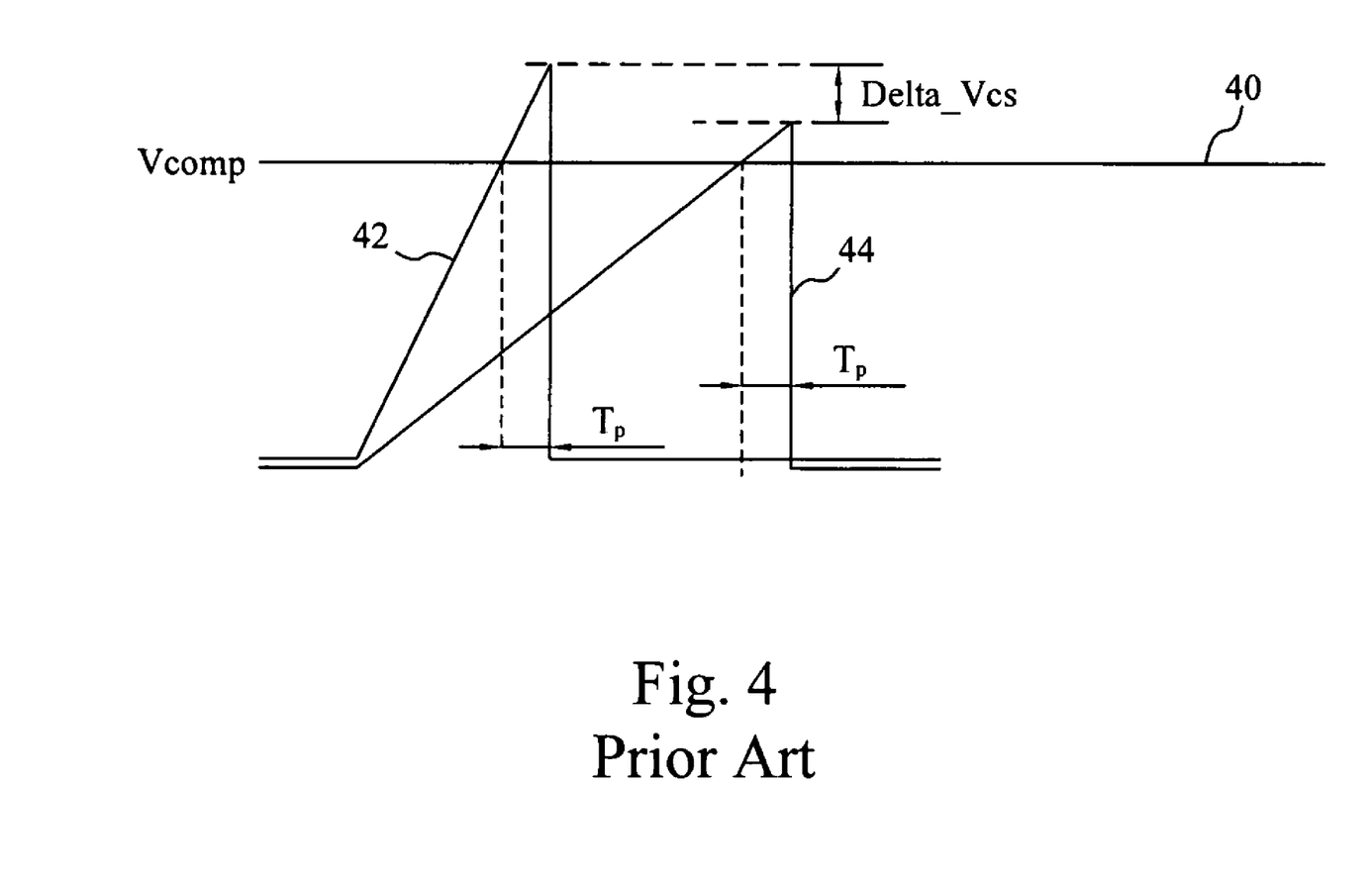
FIG. 4 is a perspective diagram of current sense signals under different input voltages.
Figure 5:
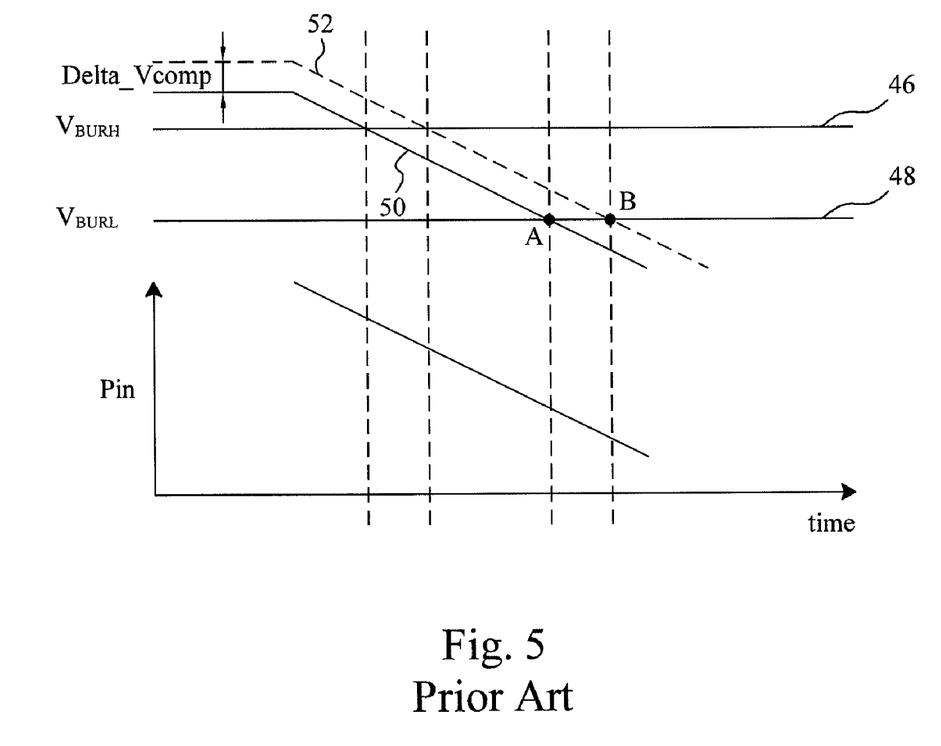
FIG. 5 is a perspective diagram of burst mode entry points under different input voltages.

FIG. 4 is a perspective diagram of the current sense signals Vcs under different input voltages Vin, in which waveform 40 represents the feedback signal Vcomp, waveform 42 represents the current sense signal Vcs corresponding to a high input voltage Vin, and waveform 44 represents the current sense signal Vcs corresponding to a low input voltage Vin. FIG. 5 is a perspective diagram of burst mode entry points of load under different input voltages Vin, in which waveform 46 represents the voltage $V_{BRUH}$, waveform 48 represents the voltage $V_{BRUL}$, waveform 50 represents the feedback signal Vcomp corresponding to a high input voltage Vin, and waveform 52 represents the feedback signal Vcomp corresponding to a low input voltage Vin following different output power conditions. Referring to FIG. 4 in conjunction with FIG. 1, if the input voltage Vin is a higher one, the current sense signal Vcs increases at a higher speed, as shown by the waveform 42; if the input voltage Vin is a lower one, the current sense signal Vcs increases at a lower speed, as shown by the waveform 44. After the current sense signal Vcs reaches the level of the feedback signal Vcomp, a propagation delay time Tp due to the delay in signal propagation must elapse before the power switch 18 is turned off. In addition, since the current sense signal Vcs increases at a higher speed under a higher input voltage Vin, the current sense signal Vcs corresponding to the higher input voltage Vin has a higher peak than the current sense signal Vcs corresponding to the lower input voltage Vin, if the propagation delay $T_P$ is a constant duration. In other words, the peak of the current I1 in the primary side of the transformer 14 is higher under the higher input voltage Vin than under the lower input voltage Vin following the same Vcomp level. In the burst mode, the current I1 has a minimum pulse:

$$I1min = (Burst\_level/Rcs) + (Vin/Lm) \times Tp, \qquad [EQ-1]$$

where Lm is magnetizing inductance. After the flyback converter 10 enters the burst mode, the frequency of each burst cycle may fall within an audible noise range of 100 Hz to 20 kHz, such that the higher the current I1 is, the louder the audible noise will be. Moreover, the feedback signal Vcomp varies with the peak value of the current I1. Referring to FIG. 5, if the input voltage Vin is higher, the peak value of the current I1 is higher and in consequence the feedback signal Vcomp is lower, as shown by the waveform 50. Hence, the flyback converter 10 enters the burst mode earlier. On the contrary, if the input voltage Vin is lower, the peak value of the current I1 is lower so that the feedback signal Vcomp is higher, as shown by the waveform 52. As a result, the entry point B of the burst mode under the lower input voltage Vin comes later than the entry point A of the burst mode under the higher input voltage Vin.

Therefore, it is desired an apparatus and method to compensate the propagation delay and thus compensate for the entry point of the burst mode.

BRIEF SUMMARY OF THE INVENTION

An object of the present invention is to provide a control circuit and method for a flyback converter to compensate the propagation delay and thereby compensate for the entry point of the burst mode of the flyback converter.

According to the present invention, a control circuit for a flyback converter including a transformer connected with a power switch switched by a control signal for the transformer to convert an input voltage into an output voltage, comprises a burst circuit to determine whether to control the flyback converter to enter a burst mode according to a feedback signal and a preset value, a compensator to compensate the feedback signal to generate a compensated feedback signal, and a pulse width modulation circuit to generate the control signal according to the compensated feedback signal and a current sense signal. The feedback signal is a function of the output voltage, and the current sense signal is a function of a current flowing through the power switch. The compensator compensates the feedback signal to prevent the entry point of the burst mode from being affected by the input voltage.

According to the present invention, a control circuit for a flyback converter including a transformer connected with a power switch switched by a control signal for the transformer to convert an input voltage into an output voltage, comprises a burst circuit to determine whether to control the flyback converter to enter a burst mode according to a feedback signal and a preset value, a compensator to compensate a current sense signal to generate a compensated current sense signal, and a pulse width modulation circuit to generate the control signal according to the feedback signal and the compensated current sense signal. The feedback signal is a function of the output voltage, and the current sense signal is a function of a current flowing through the power switch. The compensator compensates the current sense signal to prevent the entry point of the burst mode from being affected by the input voltage.

BRIEF DESCRIPTION OF THE DRAWINGS

These and other objects, features and advantages of the present invention will become apparent to those skilled in the art upon consideration of the following description of the preferred embodiments of the present invention taken in conjunction with the accompanying drawings, in which.

DETAILED DESCRIPTION OF THE INVENTION

Figure 6:
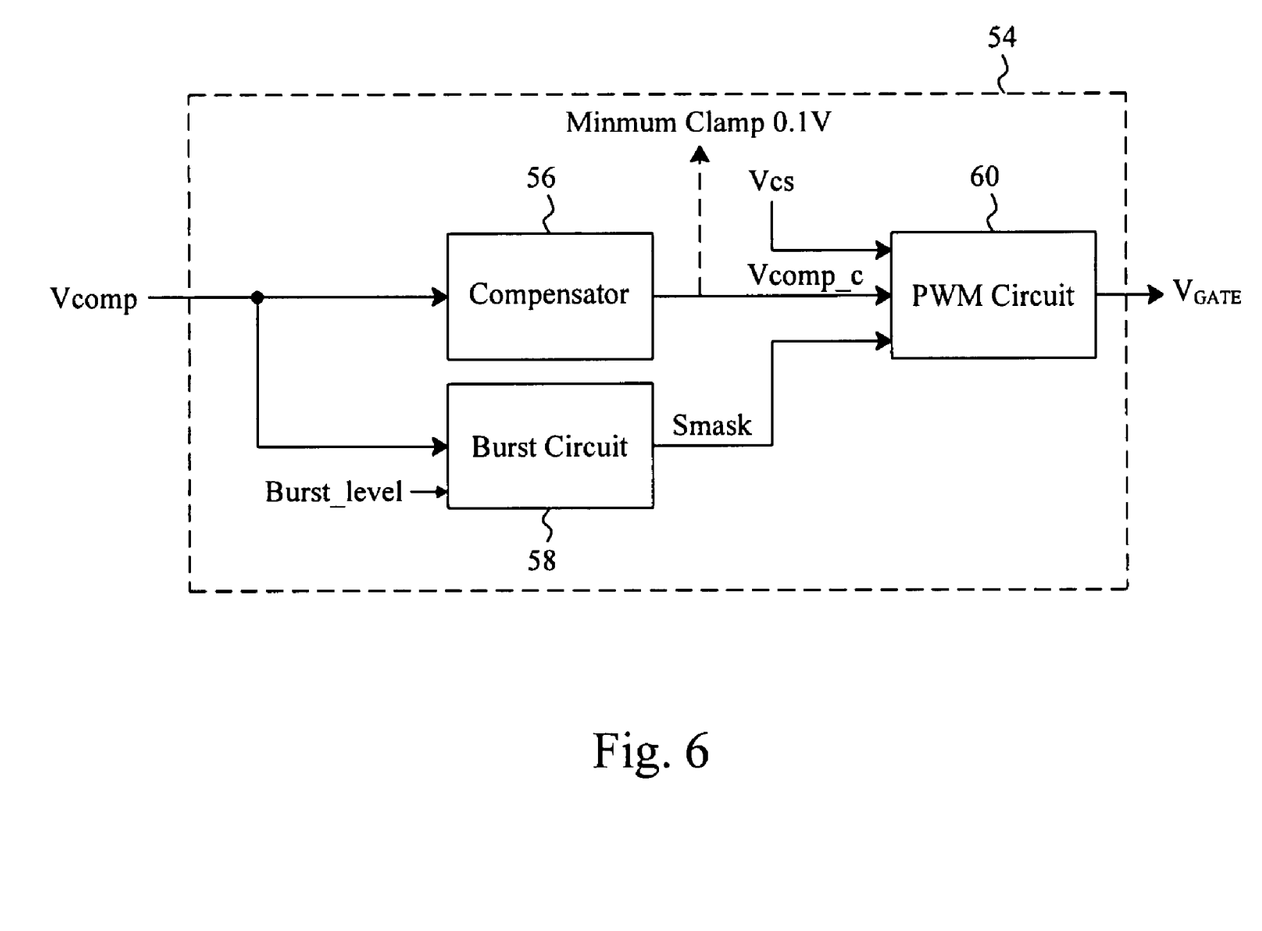
FIG. 6 is a perspective diagram of a first embodiment according to the present invention.
Figure 7:
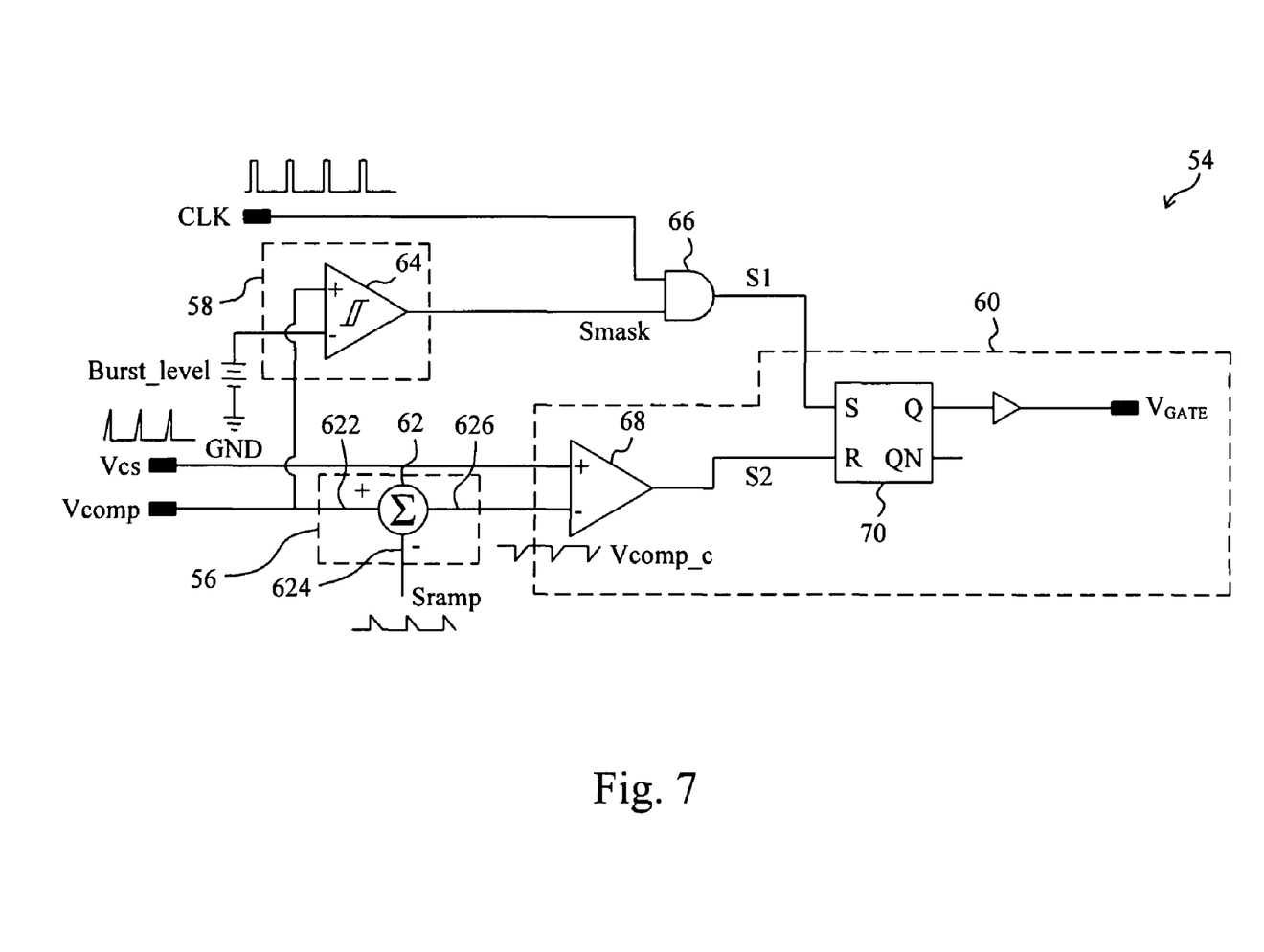
FIG. 7 is a perspective diagram of the details of the control circuit shown in FIG. 6.

FIG. 6 is a perspective diagram of a first embodiment according to the present invention. The controller 16 shown in FIG. 2 is now replaced by the control circuit 54 shown in FIG. 6 to be used in FIG. 1. In the control circuit 54, a compensator 56 compensates the feedback signal Vcomp to generate a compensated feedback signal Vcomp_c, a burst circuit 58 generates a mask signal Smask according to the feedback signal Vcomp and the preset voltage Burst_level to determine whether to control the flyback converter 10 to enter the burst mode, and a PWM circuit 60 generates the control signal $V_{GATE}$ according to the current sense signal Vcs, the compensated feedback signal Vcomp_c, and the mask signal Smask, to switch the power switch 18. FIG. 7 is a perspective diagram of the details of the control circuit 54 shown in FIG. 6. As shown in FIG. 7, the compensator 56 includes an adder 62 having a positive input 622 to receive the feedback signal Vcomp, a negative input 624 to receive a sawtooth wave Sramp synchronous with the clock CLK, and an output 626 to generate the compensated feedback signal Vcomp_c. Since the higher the input voltage Vin is, the greater the propagation delay and the higher the peak of the current I1 will be, the sawtooth wave Sramp is deducted from the feedback signal Vcomp so that the compensated feedback signal Vcomp_c has a right slope. The burst circuit 58 includes a hysteresis comparator 64 to generate the mask signal Smask according to the feedback signal Vcomp and the voltage Burst_level, and provide the mask signal Smask to an AND gate 66 to mask the clock CLK and in consequence reduce the number of times the power switch 18 is to be switched. The PWM circuit 60 includes a comparator 68 to compare the current sense signal Vcs with the compensated feedback signal Vcomp_c to generate a comparison signal S2, and a flip-flop 70 having a set input S to receive the output S1 of the AND gate 66, a reset input R to receive the signal S2, and an output Q to generate the control signal $V_{GATE}$.

Figure 8:
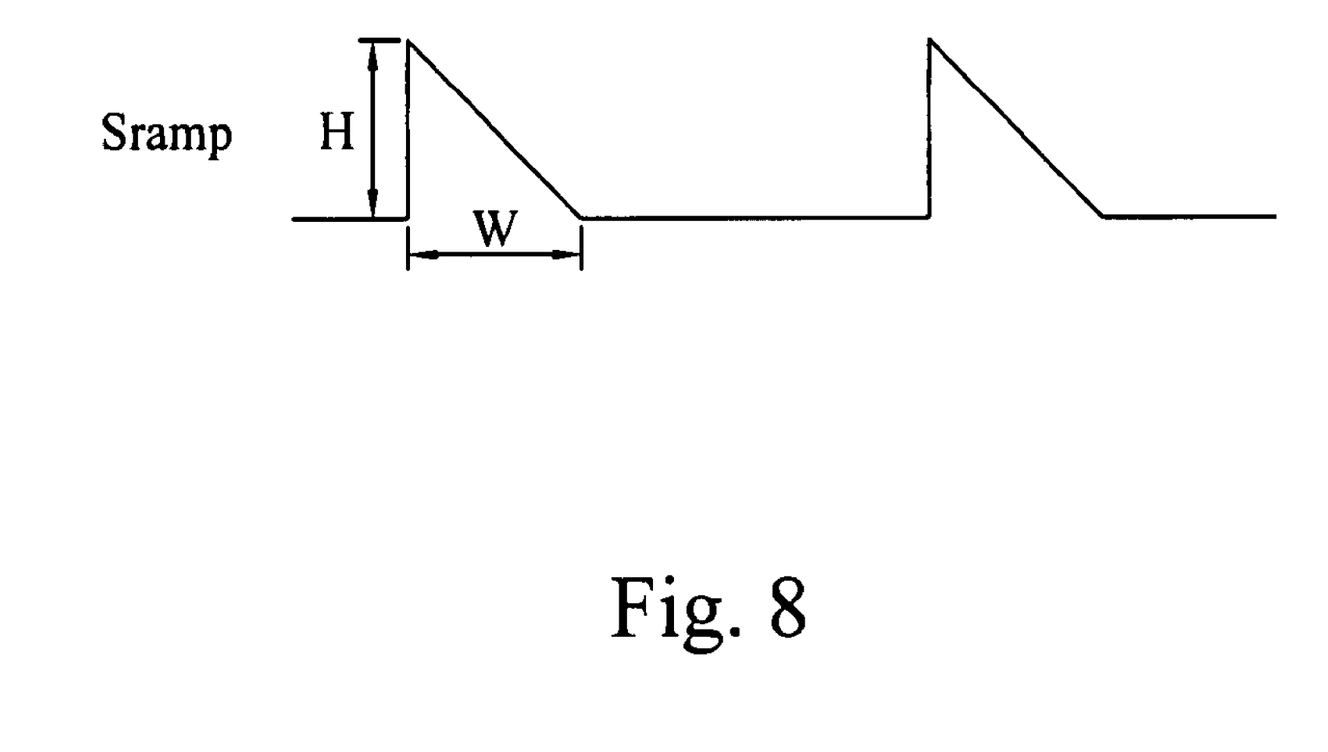
FIG. 8 shows a waveform diagram of a sawtooth wave.
Figure 9:
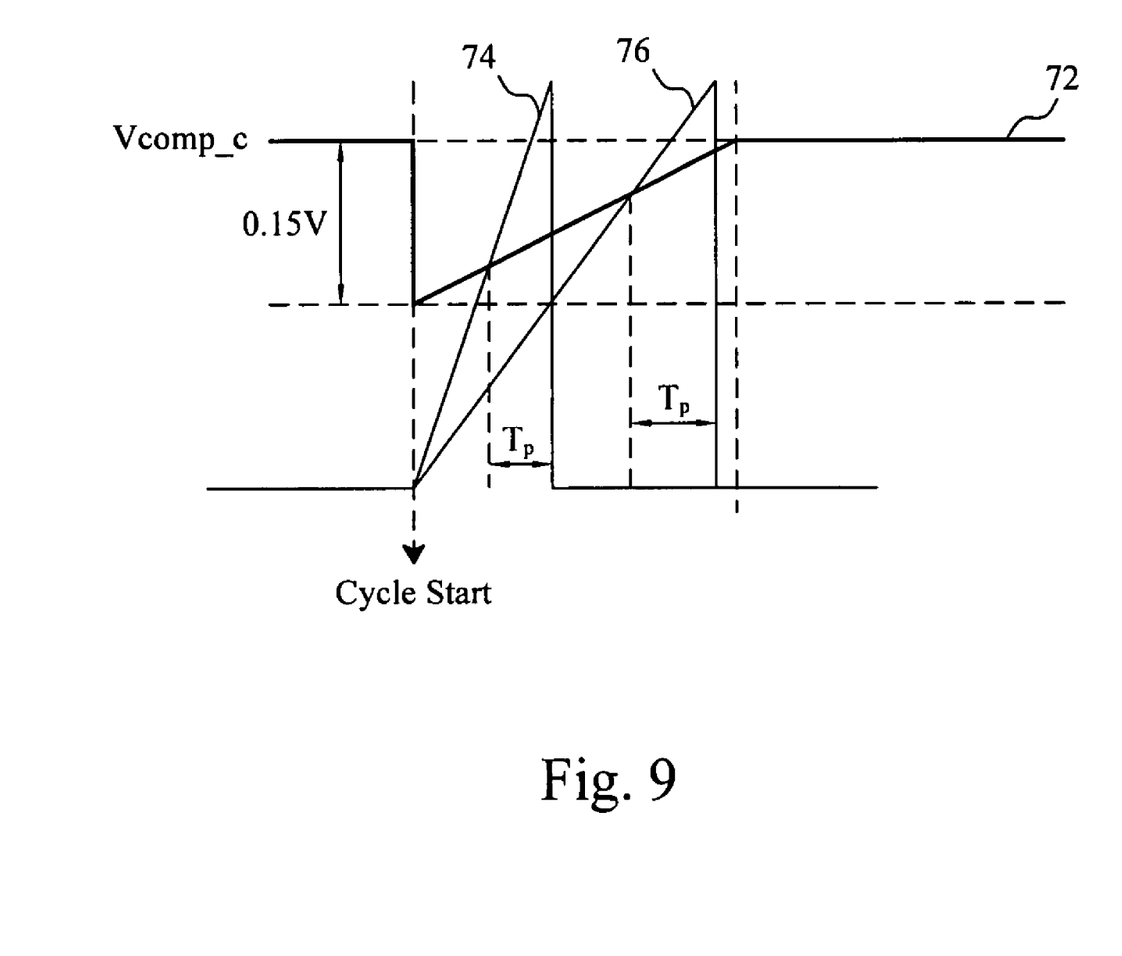
FIG. 9 is a waveform diagram of a compensated feedback signal and the current sense signals Vcs under different input voltages.

FIG. 8 is a waveform diagram of the sawtooth wave Sramp, which has a width W equal to 6.25% of the switching cycle of the power switch 18 and a peak-to-valley difference H approximately equal to 0.15 V. FIG. 9 is a waveform diagram of the compensated feedback signal Vcomp_c and the current sense signals Vcs under different input voltages Vin, in which waveform 72 represents the compensated feedback signal Vcomp_c, waveform 74 represents the current sense signal Vcs corresponding to a higher input voltage Vin, and waveform 76 represents the current sense signal Vcs corresponding to a lower input voltage Vin. In this embodiment, the difference between the highest value and the lowest value of the compensated feedback signal Vcomp_c is about 0.15 V, and the compensated feedback signal Vcomp_c has a right slope. If the input voltage Vin is a higher one, the current sense signal Vcs increases at a higher speed, as shown by the waveform 74, and consequently the compensated feedback signal Vcomp_c is lower for the current sense signal Vcs under the higher input voltage Vin to reach. On the contrary, if the input voltage Vin is a lower one, the current sense signal Vcs increases at a lower speed, as shown by the waveform 76, so that the compensated feedback signal Vcomp_c is higher for the current sense signal Vcs under the lower input voltage Vin to reach. Since the current sense signal Vcs under the higher input voltage Vin only has to increase to the lower level to reach the compensated feedback signal Vcomp_c, and the current sense signal Vcs under the lower input voltage Vin has to increase to the higher level to reach the compensated feedback signal Vcomp_c, the peak values of the current sense signals Vcs in both cases are substantially the same after the propagation delay Tp. In other words, be the input voltage Vin high or low, the current I1 flowing through the power switch 18 will remain substantially the same, and the effect of the propagation delay is thus minimized.

After the feedback signal Vcomp is compensated with the sawtooth wave Sramp, the current I1 flowing through the power switch 18 under different input voltages Vin stays substantially the same. As a result, the entry point of the burst mode no longer changes with the variation of the input voltage Vin, and the propagation delay is reduced to minimum.

Besides, in the burst mode, the peak value of the current I1 will not rise because of a higher input voltage Vin, so that the audible noise is decreased.

Figure 10:
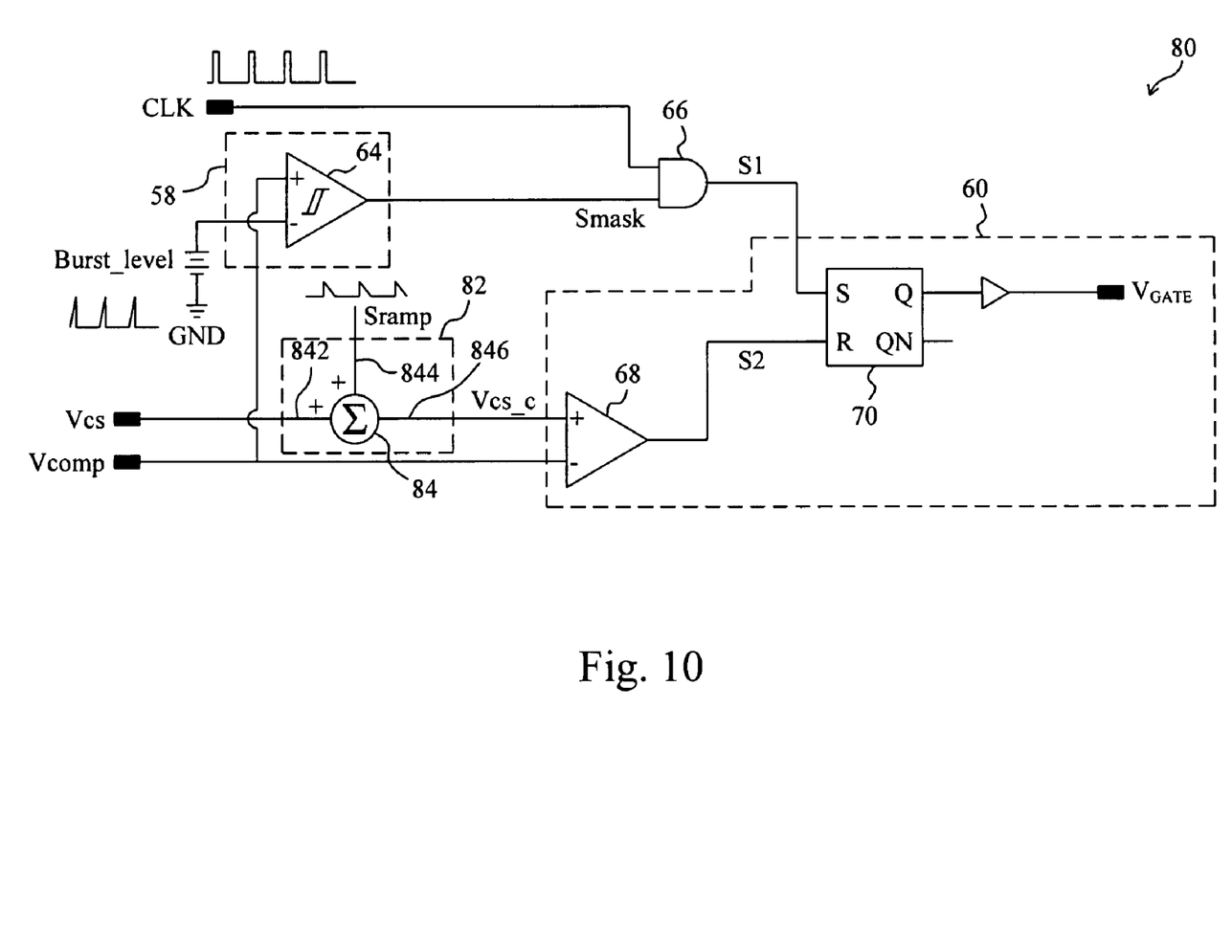
FIG. 10 is a perspective diagram of a second embodiment according to the present invention.

FIG. 10 is a perspective diagram of a second embodiment according to the present invention, in which a control circuit 80 also includes the burst circuit 58, the PWM circuit 60 and the AND gate 66. The control circuit 80 further includes a compensator 82 to compensate the current sense signal Vcs to generate a compensated current sense signal Vcs_c. The comparator 68 in the PWM circuit 60 compares the compensated current sense signal Vcs_c with the feedback signal Vcomp to generate the signal S2, which is then supplied to the reset input R of the flip-flop 70. The compensator 82 includes an adder 84 having two positive inputs 842 and 844 to receive the current sense signal Vcs and the sawtooth wave Sramp respectively, and an output 846 to provide the compensated current sense signal Vcs_c. Similarly, after the current sense signal Vcs is compensated with the sawtooth wave Sramp, the peak value of the current I1 flowing through the power switch 18 will remain substantially the same under different input voltages Vin, so that the entry point of the burst mode will not change as the input voltage Vin varies.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A control method for a flyback converter including a transformer connected with a power switch switched by a control signal for the transformer to convert an input voltage into an output voltage, the control method comprising:
   detecting the output voltage to generate a feedback signal;
   detecting a current flowing through the power switch to generate a current sense signal;
   determining whether to control the flyback converter to enter a burst mode according to the feedback signal and a preset value;
   compensating the feedback signal to generate a compensated feedback signal; and
   generating the control signal according to the compensated feedback signal and the current sense signal;
   wherein the feedback signal is compensated to prevent an entry point of the burst mode from being affected by the input voltage.

2. The control method of claim 1, wherein the step of generating the control signal comprises:
   comparing the compensated feedback signal with the current sense signal to generate a comparison signal; and
   generating the control signal according to the comparison signal and a clock.

3. The control method of claim 2, wherein the step of determining whether to control the flyback converter to enter a burst mode according to the feedback signal and a preset value comprises generating a mask signal according to the feedback signal and the preset value to mask the clock.

4. The control method of claim 1, wherein the step of generating the compensated feedback signal comprises deducting a sawtooth wave from the feedback signal to generate the compensated feedback signal.

5. A control circuit for a flyback converter including a transformer connected with a power switch switched by a control signal for the transformer to convert an input voltage into an output voltage, the control circuit comprising:

a compensator compensating a current sense signal with a sawtooth wave to generate a compensated current sense signal, the current sense signal being a function of a current flowing through the power switch; and
   a pulse width modulation circuit connected to the compensator to generate the control signal according to a feedback signal and the compensated current sense signal, the feedback signal being a function of the output voltage;
   wherein the sawtooth wave is used to stabilize an entry point of a burst mode.

6. The control circuit of claim 5, wherein the pulse width modulation circuit comprises:
   a comparator connected to the compensator to compare the feedback signal with the compensated current sense signal to generate a comparison signal; and
   a flip-flop connected to the comparator to generate the control signal according to the comparison signal and a clock.

7. The control circuit of claim 5, wherein the compensator comprises an adder having a first positive input to receive the current sense signal, a second positive input to receive the sawtooth wave, and an output to provide the compensated current sense signal.

8. The control circuit of claim 5, further comprising a burst circuit to determine whether to control the flyback converter to enter the burst mode according to the feedback signal and a preset value.

9. The control circuit of claim 5, wherein the burst circuit comprises a comparator to generate a mask signal according to the feedback signal and the preset value to reduce the number of times the power switch is to be switched.

10. The control circuit of claim 9, wherein the comparator is a hysteresis comparator.

11. A control method for a flyback converter including a transformer connected with a power switch switched by a control signal for the transformer to convert an input voltage into an output voltage, the control method comprising:
    detecting the output voltage to generate a feedback signal;
    detecting a current flowing through the power switch to generate a current sense signal;
    determining whether to control the flyback converter to enter a burst mode according to the feedback signal and a preset value;
    compensating the current sense signal to generate a compensated current sense signal; and
    generating the control signal according to the feedback signal and the compensated current sense signal;
    wherein the current sense signal is compensated to prevent an entry point of the burst mode from being affected by the input voltage.

12. The control method of claim 11, wherein the step of generating the control signal comprises:
    comparing the feedback signal with the compensated current sense signal to generate a comparison signal; and
    generating the control signal according to the comparison signal and a clock.

13. The control method of claim 12, wherein the step of determining whether to control the flyback converter to enter a burst mode according to the feedback signal and a preset value comprises generating a mask signal according to the feedback signal and the preset value to mask the clock.

14. The control method of claim 11, wherein the step of generating the compensated current sense signal comprises adding a sawtooth wave to the current sense signal to generate the compensated current sense signal.

* * * * *